United States Patent [19]

Bruckert

[11] Patent Number: 5,485,631
[45] Date of Patent: Jan. 16, 1996

[54] MANIFOLD ANTENNA STRUCTURE FOR REDUCING REUSE FACTORS

[75] Inventor: Eugene J. Bruckert, Arlington Heights, Ill.

[73] Assignee: Motorola, Inc., Schaumburg, Ill.

[21] Appl. No.: 48,558

[22] Filed: Apr. 14, 1993

Related U.S. Application Data

[63] Continuation of Ser. No. 659,779, Feb. 22, 1991, abandoned.

[51] Int. Cl.⁶ .................................................. H04Q 7/36
[52] U.S. Cl. ...................... 455/33.3; 455/33.4; 455/34.1; 455/56.1; 379/59
[58] Field of Search .................... 455/33.1, 33.2, 455/33.4, 33.3, 54.1, 56.1, 272, 277, 34.1; 379/59, 60

[56] References Cited

U.S. PATENT DOCUMENTS

| | | | |
|---|---|---|---|
| 4,128,740 | 12/1978 | Graziano | 455/33.1 |
| 4,144,496 | 3/1979 | Cunningham | 455/33.4 X |
| 4,369,520 | 1/1983 | Cerny, Jr. et al. | 455/137 |
| 4,475,010 | 10/1984 | Huensch et al. | 379/60 |
| 4,694,484 | 9/1987 | Atkinson et al. | 379/59 |
| 5,038,399 | 8/1991 | Bruckert | 455/33.2 |
| 5,095,535 | 3/1992 | Freeburg | 455/278.1 |
| 5,103,459 | 4/1992 | Gilhousen et al. | 455/33.1 |

OTHER PUBLICATIONS

Simon C. Swales, Mark A. Beach, David J. Edwards, and Joseph P. McGeehan, "The Performance Enhancement of Multibeam Adaptive Base–Station Antennas for Cellular Land Mobile Radio Systems" (IEEE Transactions on Vehicular Technology, vol. 39, No. 1 Feb. 1990).

Primary Examiner—Edward F. Urban
Attorney, Agent, or Firm—Anthony J. Sarli; Anthony G. Sitko

[57] ABSTRACT

A system is offered of increasing signal quality within a cellular communication system through the use of directional antennas and random assignment of communication resources.

2 Claims, 8 Drawing Sheets

| REPEAT PATTERN | # OF SECTORS | # OF VNBAs | C/I 5% | 10% | 50% |
|---|---|---|---|---|---|
| 1-SITE | 3 (120°) | 4 | 5.6dB | 9.0dB | 17.6dB |
| 1-SITE | 3 | 6 | 7.5dB | 10.9dB | 18.8dB |
| 3-SITE | 3 | 4 | 12.9dB | 15.7dB | 25.5dB |
| 3-SITE | 3 | 6 | 14.0dB | 17.25dB | 26.5dB |
| 4-SITE | 3 | 4 | 15.6dB | 19dB | >30dB |

MANIFOLD ANTENNA STRUCTURE FOR REDUCING REUSE FACTORS

This is a continuation of application Ser. No. 07/659,779, filed Feb. 22, 1991 and now abandoned.

FIELD OF THE INVENTION

This invention relates to communication systems and more specifically to trunked communication systems.

BACKGROUND OF THE INVENTION

Trunked cellular communication systems are known. Such systems are typically divided over geographical areas into substantially contiguous service coverage areas, each served from a base site. Mobile communication units passing through a service coverage area served by a base site typically transmit service requests to the base sites, which requests are answered with a resource allocation dedicated by the base site for use by the requesting communication unit. Such a system is typically referred to as a frequency division multiple access system (FDMA).

Communication resources used by a base site and allocated to the communication system may consist of a frequency spectrum divided for use by the system into a number of communication resources. Each communication resource may consist of a pair of frequencies. The pair of frequencies may be used by a communication unit to transmit and receive information.

Communication resource use by a base site may also be divided by function with at least one resource, in some systems, reserved for the two-way transmission of control information between the base site and communication units passing through the service coverage area of the base site. Other resources may be reserved for use by communication units for communication transactions following allocation of a resource for such use following request and allocation by the base site.

Since a limited number of communication resources may exist within a frequency spectrum the reuse of communication resources is necessary within the geographic area served by the communication system. Reuse, on the other hand, is often limited by mutual interference between communication units, and base sites, operating on the same frequency in the same system.

Reuse of a communication resource within a communication system is limited by a number of factors. Chief among the factors, specifically in a communication system having an omnidirectional antenna structure, is distance between reusing transmitters and the power of the transmitted signal. Where transmitting power is fixed within communication units by design then the remaining factor determining reuse is distance. The distance between reusing communication units is often specified in terms of the ratio of the distance (D) between the centers of nearest, neighboring co-channel cells to the radius (R) of a cell. The reuse ratio, D/R, specifies the proximity of the closest reusing base site.

Another factor affecting reuse is the transmitted power of a communication signal. As the power of the transmitted signal is reduced the proximity between reusing base sites becomes smaller and smaller. One patent teaching of such an approach is that of Cunningham et at. (U.S. Pat. No. 4,144,496). Cunningham teaches of a method of subdividing a large cell into a number of smaller cells. Communication resources assigned to the large cell are divided among the smaller cells. Directional antennas are also used in Cunningham to isolate reusing base sites in an effort to reduce co-channel interference.

The use of directional antennas was also taught in Graziano (U.S. Pat. No. 4,128,740) as a method of reducing the reuse factor. Directional antennas were used in Graziano in combination with a resource assignment algorithm to produce a co-channel reuse ratio of 4.

Graziano and Cunningham rely upon fixed assignment methods and directional antennas to reduce the incidence of interference. The incidence of interference, on the other hand, is not a constant phenomenon. Reuse of communication resources, as is known, may occur whenever the incidence of interference is below a threshold relative to the desired signal, based on measured signal parameters.

Measured parameters determining reuse factors for a system may be based upon a determination of signal to interference (S/I) for a desired transmitter in the presence of an interferer and where interference is a combination of thermal and co-channel interfering signals. (An alternate term, C/I, or carrier to interference, is more frequently used in determining reuse factors.) A minimum reuse factor, as is known for analog radios, may be achieved whenever the measured signal from the desired transmitter (C/I ratio) is 17 dB above measured interference.

In the past reuse factors could be determined by placing a desired transmitter at the edge of the service coverage area of a home cell and measuring the distance to an interferer in cell diameters to achieve the 17 dB difference in signal strengths. Under past advances in technology, however, reuse factors are calculated based upon computer simulations.

Advances (described in Cunningham), resulting in a reduced reuse factors, have been the development of directional antennas and selective assignment of frequencies. Past developments (as in Graziano) have included cells divided into as many as six sectors with a 60 degree sector antenna providing coverage within each sector. The selective assignment of resources then precluded reassignment of adjacent channel resources within adjacent sectors. Use of the 60 degree sector antennas, and the selective assignment of frequencies, as mentioned, have resulted in reuse factors as low as four.

Digital communication systems such as code division multiple access (CDMA) are also known. Such systems may operate in a frequency hopping mode under which transmitting and receiving units transceive on a given communication resource for only a short period before indexing to a new resource in a list of assigned resources. CDMA communication systems, as is known, have a much greater resistance to interference than FDMA or TDMA communication units. The greater resistance to interference of CDMA systems may be attributable to the limited transmission time on any given resource and the spectrum limited scope of interference sources. Other sources of resistance to interference within CDMA systems arise from the broad range of coding techniques for the CDMA signal and the variable signal content of coded speech. Digital communication systems, as is known, are capable of proper operation in C/I environments of at least 9 dB 90% of the time or C/I environments of at least 17 dB 50% of the time.

Because of increasing competition for a limited frequency spectrum a need exists to allow operation of competing communication systems on identical frequencies without mutual interference and with a minimum reuse factor. Such a communication system must have an increased sensitivity to a desired signal or a reduced susceptibility to interference.

SUMMARY OF THE INVENTION

Under one embodiment of the invention a method is offered of improving signal quality of a signal communicated on a communication resource within a communication system between a communication unit located within a service coverage area of a base site of a plurality of base sites within the communication system and the base site. The method includes dividing each service coverage area into at least two sectors, inclusive of the service coverage area, with each sector substantially covered by a directional antenna. The method further includes providing communication access to the communication unit located within the sector through the directional antenna covering the sector on a communication resource randomly selected from a plurality of communication resources within the system.

BRIEF DESCRIPTION OF A PREFERRED EMBODIMENT

Figure 1:
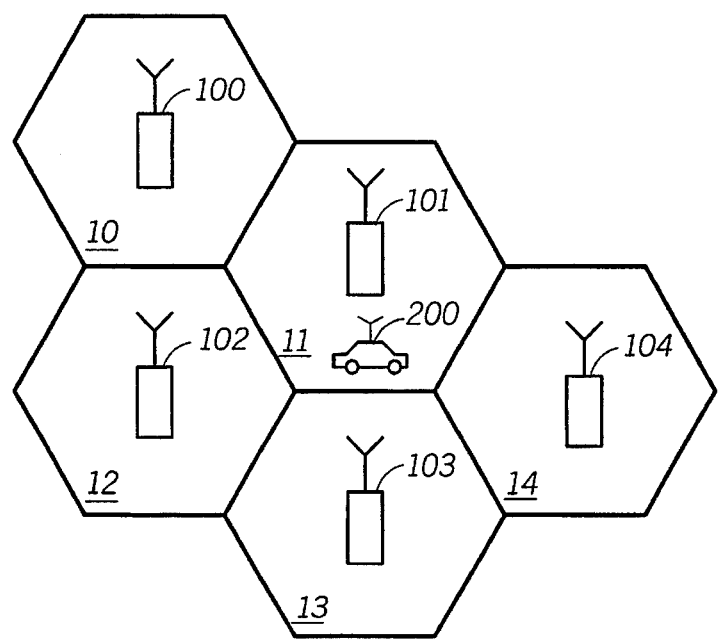
FIG. 1 depicts a cellular communication system in a geographic context.
Figure 3:
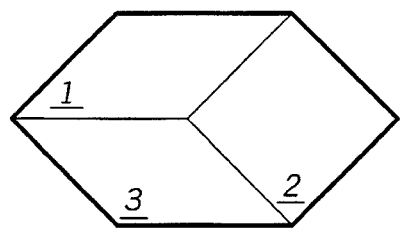
FIG. 3 depicts sectorization of a service coverage area.
Figure 4:
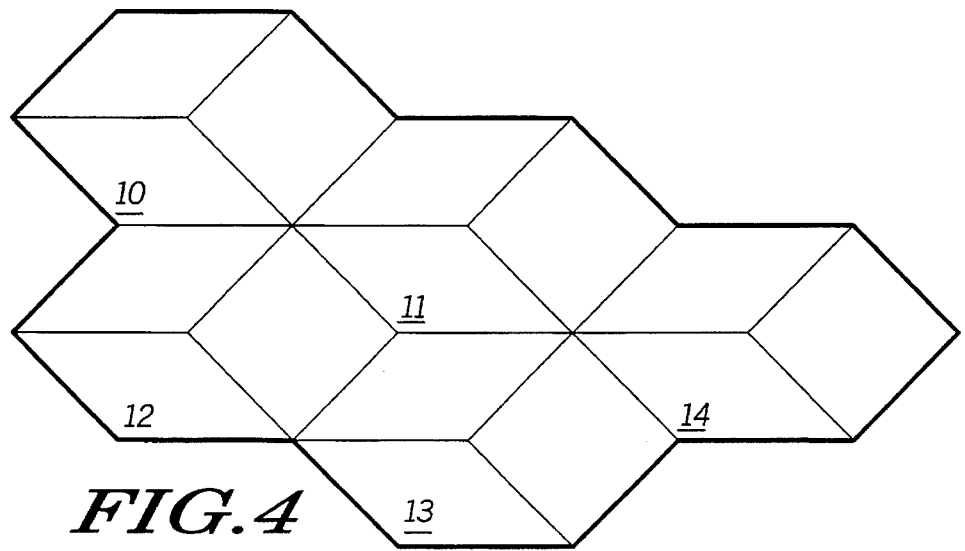
FIG. 4 depicts the service coverage areas of a communication system sectorized in a substantially identical, orientation specific pattern.

Pursuant to one embodiment of the invention a communication system (FIG. 1) is divided into a number of service coverage areas (10 through 14), each with a centrally located base site (100 through 104) within the service coverage area. Service coverage areas within the communication system (FIG. 1) are sub-divided or sectorized about the base sites (100 through 104) into 120 degrees arcs (FIG. 3, sector 1, sector 2, and sector 3). Adjacent service coverage areas are sectorized with the dividing lines of corresponding sectors of adjacent service coverage areas being substantially parallel, thereby forming substantially identical, orientation specific patterns of at least three sectors per service coverage area (FIG. 4).

Available within the communication system is a set of communication resources, F, which have been subdivided into three subsets, F1, F2, and F3. The subsets of resources (F1, F2, and F3) are assigned to the three sectors of each service coverage area in a substantially identical, orientation specific pattern wherein: subset F1 is assigned to sector 1, subset F2 is assigned to sector 2, and subset F3 is assigned to sector 3.

Each sector of each service coverage area is provided with at least four very narrow beam antennas (VNBAs), located at the base site which radially divide each sector into at least four partially overlapping subsectors (FIG. 5, 500, 501, 502, and 503). The four subsectors (500, 501, 502, and 503) are inclusive of the sector (2, FIG. 3). By design a VNBA serving a subsector (500, 501, 502, or 503) amplifies signals originating within the subsector served (500, 501, 502, or 503) and attenuates signals originating outside the subsector.

Figure 2:
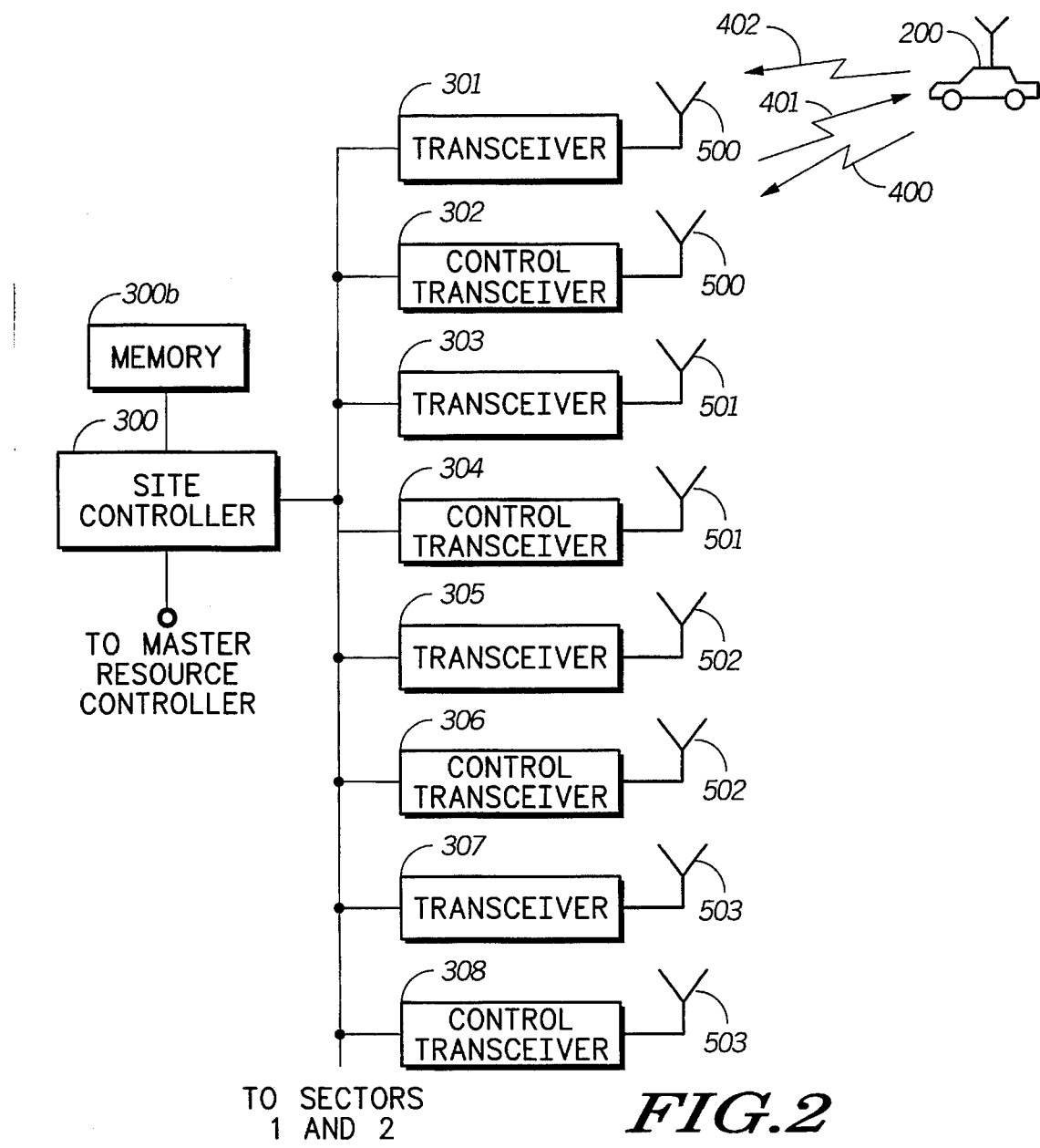
FIG. 2 comprises a block diagram of communication equipment serving a subsector of a service coverage area.
Figure 5:
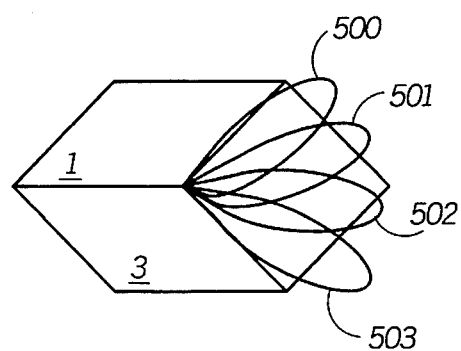
FIG. 5 depicts four subsectors served by VNBAs within a sector.

Shown (FIG. 2) is a block diagram of a sector of a base site (100, 101, 102, 103, or 104). Located at the base site are a number of transceivers (301, 303, 305, and 307), a number of control transceivers (302, 304, 306, and 308), and a site controller (300). Each transceiver (301, 303, 305, and 307) and each control transceiver (302, 304, 306, and 308) are depicted with an antenna designation indicating the subsector (500, 501, 502, and 503) served.

The sector depicted (FIG. 2) is that of sector 3. The depiction (FIG. 2) may be extended to cover sectors 1 and 2 through the addition of a transceivers (301, 303, 305, and 307) and control transceivers (302, 304, 306, and 308) for each subsector for sectors 1 and 2.

In requesting communication services a communication unit (FIG. 1, 200) located in service coverage area 11, sector 3, subsector 500 first transmits a resource request (400) to a control transceiver (302). Since subsector 500 is covered by a VNBA located at base site 101 the resource request is received exclusively by control transceiver 302.

The resource request (400) may include an ID of the communication unit (200) and a number of a target (not shown). The site controller (300) upon receiving the resource request (400) through the control transceiver (302) decodes the request and responds with a resource allocation (401) transmitted to the communication unit (200) through the control transceiver (302). The transmitted resource allocation (401), in addition to information relative to the requesting communication unit (200), may contain information identifying a resource to be used by the communication unit (200) during the communication transaction.

In conjunction with transmission of the resource allocation (401) the site controller (300) may also allocate a transceiver (301) to service the communication transaction. Upon receipt of the resource allocation (401) the communication unit (200) tunes to the allocated resource and begins transmitting a transaction signal (402). The transceiver (302) receives the transaction signal (402) and communicates the signal (402) to the target (not shown).

The resource allocated in the above example within sector 3 comprised a resource from within subset F3. Allocation of a resource from F3 to the communication unit (200) in service coverage area 11, sector 3, subsector 500 precludes reuse of the resource in the remaining subsectors (501, 502, or 503) of sector 3. Assignment of a resource to a subsector within a sector, on the other hand, is performed on a random basis (within the sector) or under a suitable algorithm entered into the site resource controller (300) controlling resource assignment within the sector.

Use of VNBAs limits transmission and reception of a signal on a resource to an area of approximately 25% of a sector. Use of a VNBA limits the potential for mutual interference to an area radially disposed from the base site. Since assignment within a sector is on a random basis reuse of the same resource in another service coverage area providing a mutually interfering signal is significantly reduced.

Operation of a communication unit within a communication system from any of a number of base sites (as described above) depends upon a sufficient Ca ratio. Use of a VNBA within a sector increases average C/I by attenuating signals originating outside an are defined by the subsector of the VNBA and in other nearby service coverage areas. Increasing the C/I ratio, by definition, allows for a reduced reuse factor since an increase in C/I allows base sites operating on the same resource to operate in closer proximity.

Figure 6:
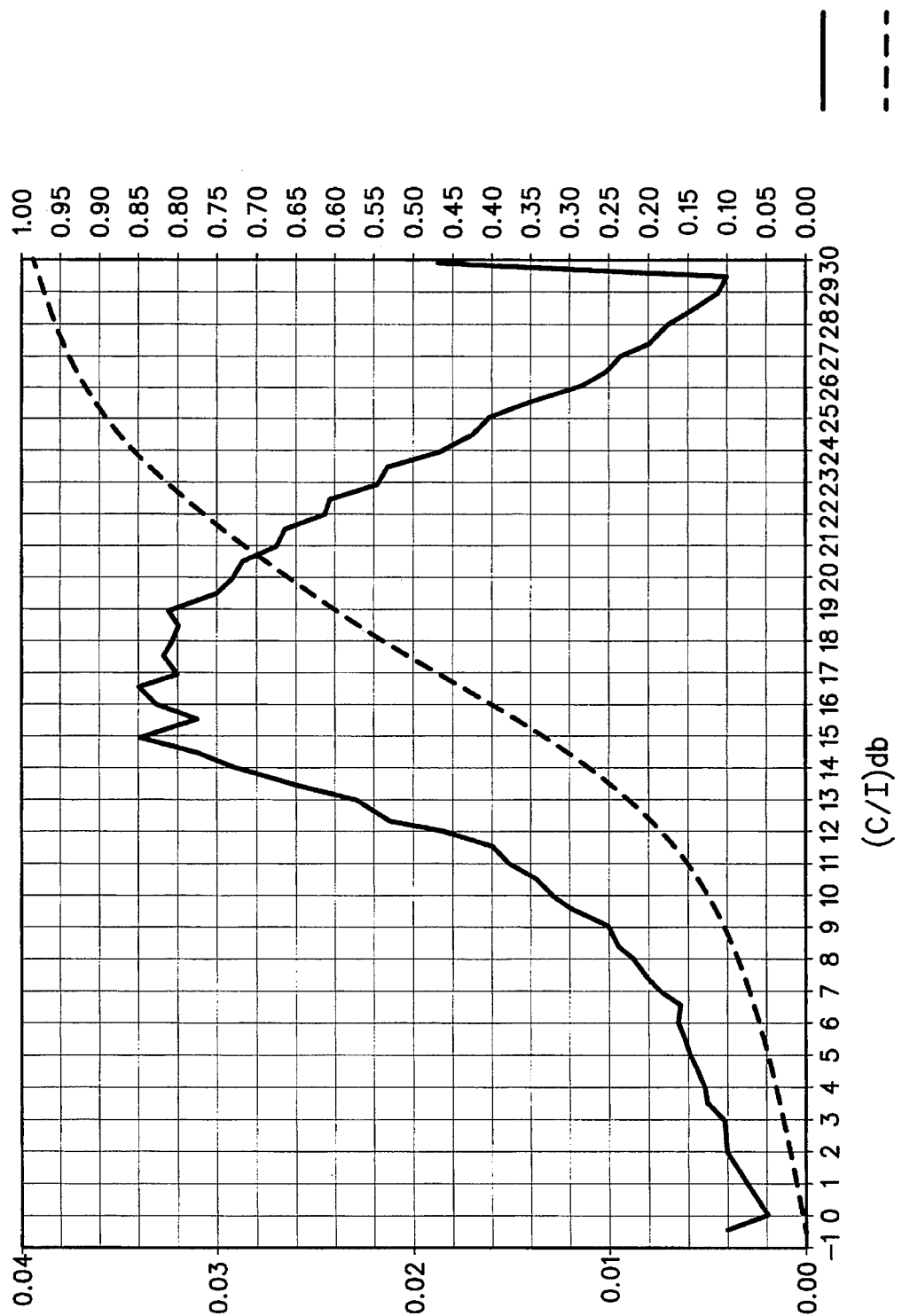
FIG. 6 depicts results of a computer simulation of operation of a communication system under the invention with a 1 cell repeat pattern.
Figures 11, 12:
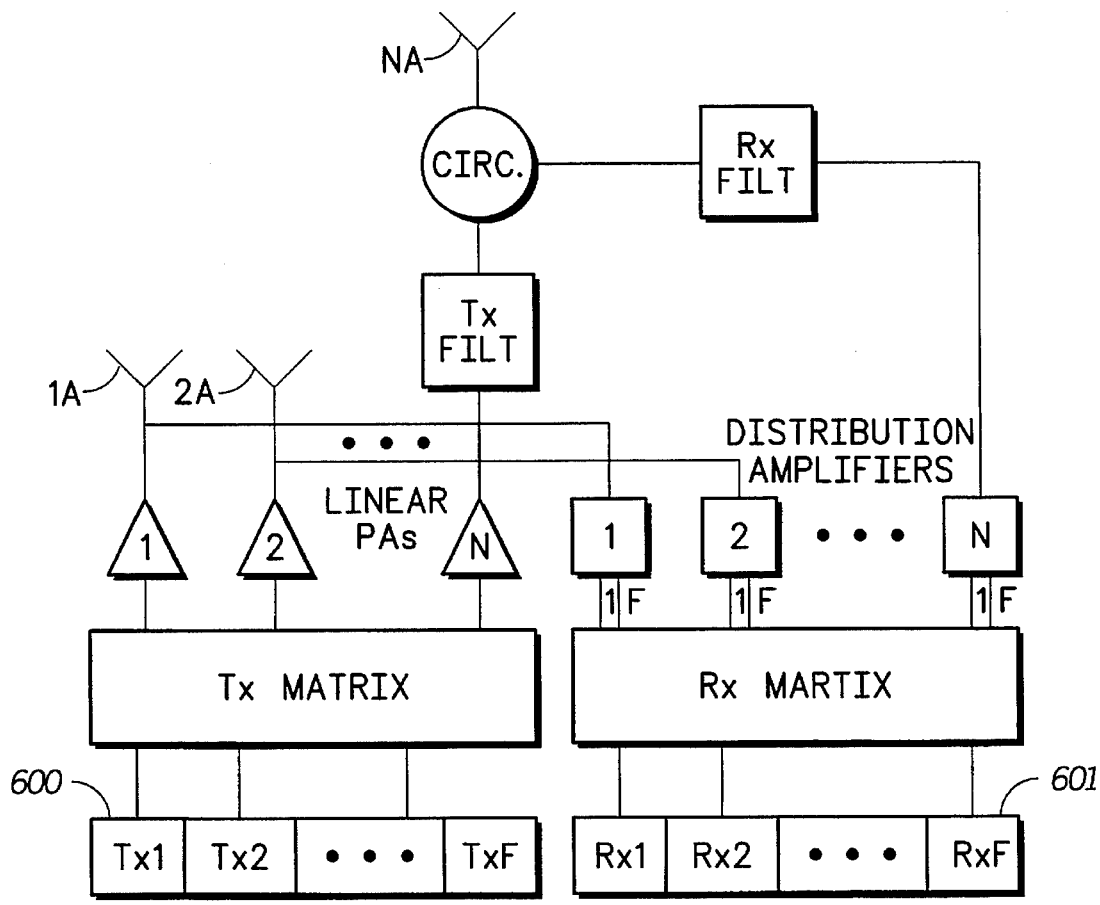
FIG. 11 comprises a table of results of the computer simulations.
FIG. 12 comprises a block diagram of a matrix switch for an antenna system.

Shown (FIG. 6) is a computer simulation of a cellular communication system under the invention for a slow hopping CDMA communication system. The simulation assumes a one cell repeat pattern (reuse factor), 3 sectors per service coverage area, four VNBAs per sector, and 18 interfering communication units. The plot above, and to the left, represents a probability distribution factor of interference. The curve to the right, and below, indicates a projected C/I experienced by a communication unit operating under the described conditions. The first line in FIG. 11 represents a summary of the information shown in FIG. 6. As shown (FIG. 11) the C/I ratio (FIG. 6) exceeds 5.6 dB 95% of the time, exceeds 10 dB 90% of the time and exceeds 17.6 dB 50% of the time.

Figure 7:
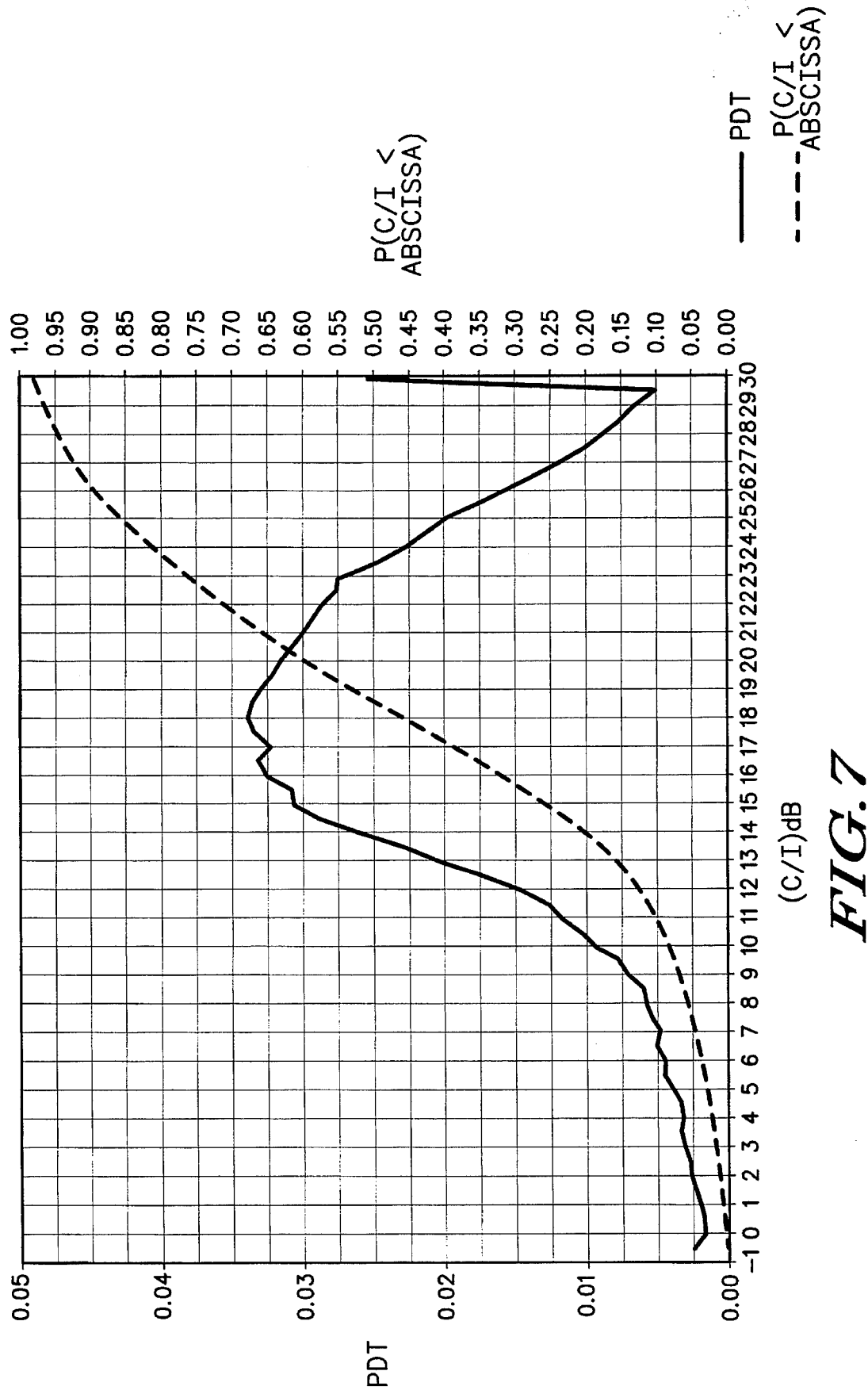
FIG. 7 depicts results of a computer simulation of operation of a communication system under another embodiment of the invention with a 1 cell repeat pattern.

FIG. 7 represents another embodiment of the invention. In FIG. 7, for a one cell repeat pattern, the 3 sectors in each service coverage area have been divided into 6 subsectors, each served by a 20 degree VNBA. FIG. 11, line 2, in this embodiment (FIG. 7) indicates a Ca ratio exceeding 7.5 dB 95% of the time, 10.9 dB 90% of the time, and 18.8 dB 50% of the time.

Figure 8:
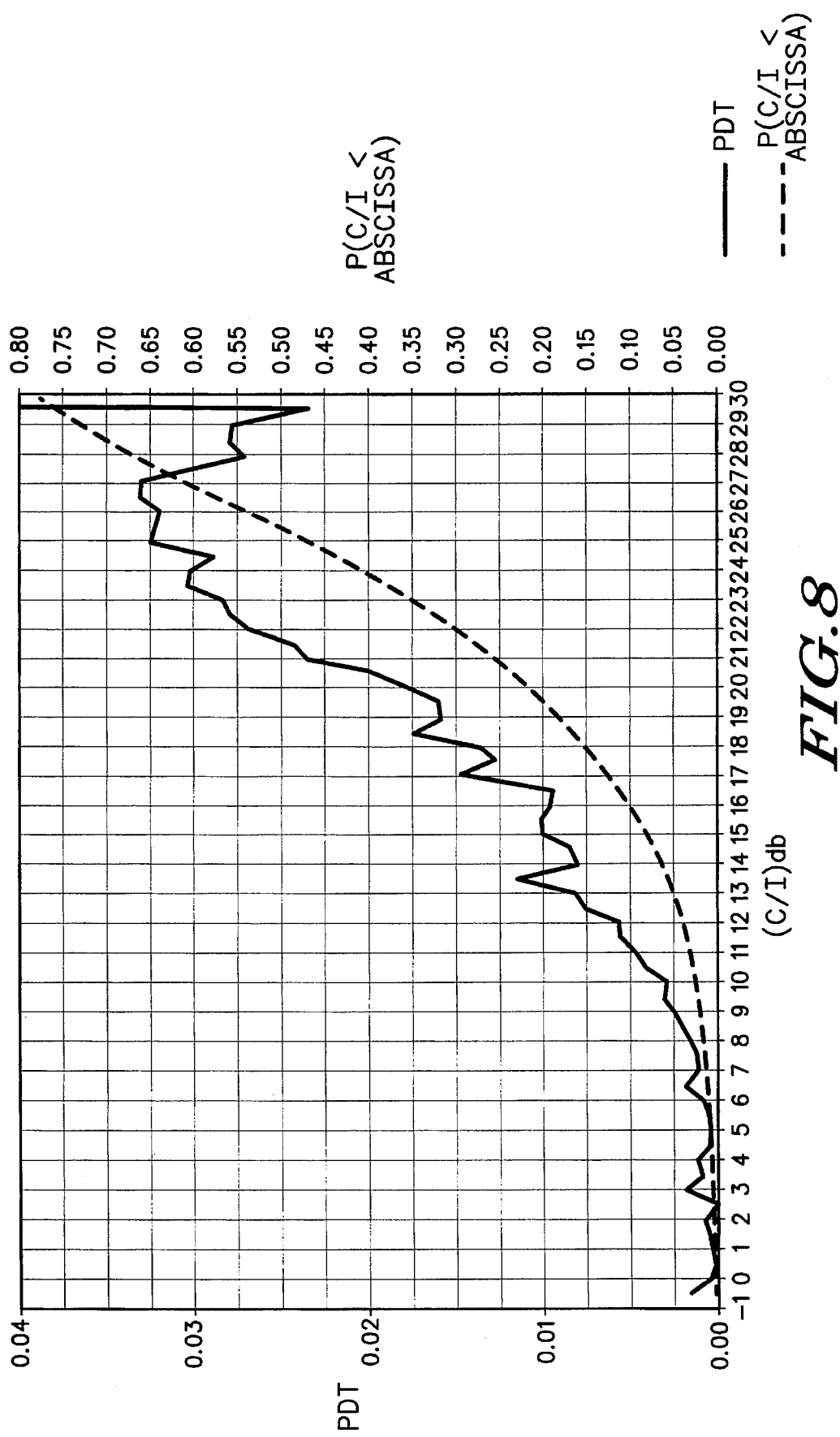
FIG. 8 depicts results of a computer simulation of operation of a communication system under the invention with a 3 cell repeat pattern.

FIG. 8 represents results under the invention for a 3 cell repeat pattern, 3 sectors per cell, and four subsectors per sector. As shown (FIG. 11, line 3) C/I exceeds 12.9 dB 95% of the time, 15.7 dB 90% of the time, and 25.5 dB 50% of the time.

Figure 9:
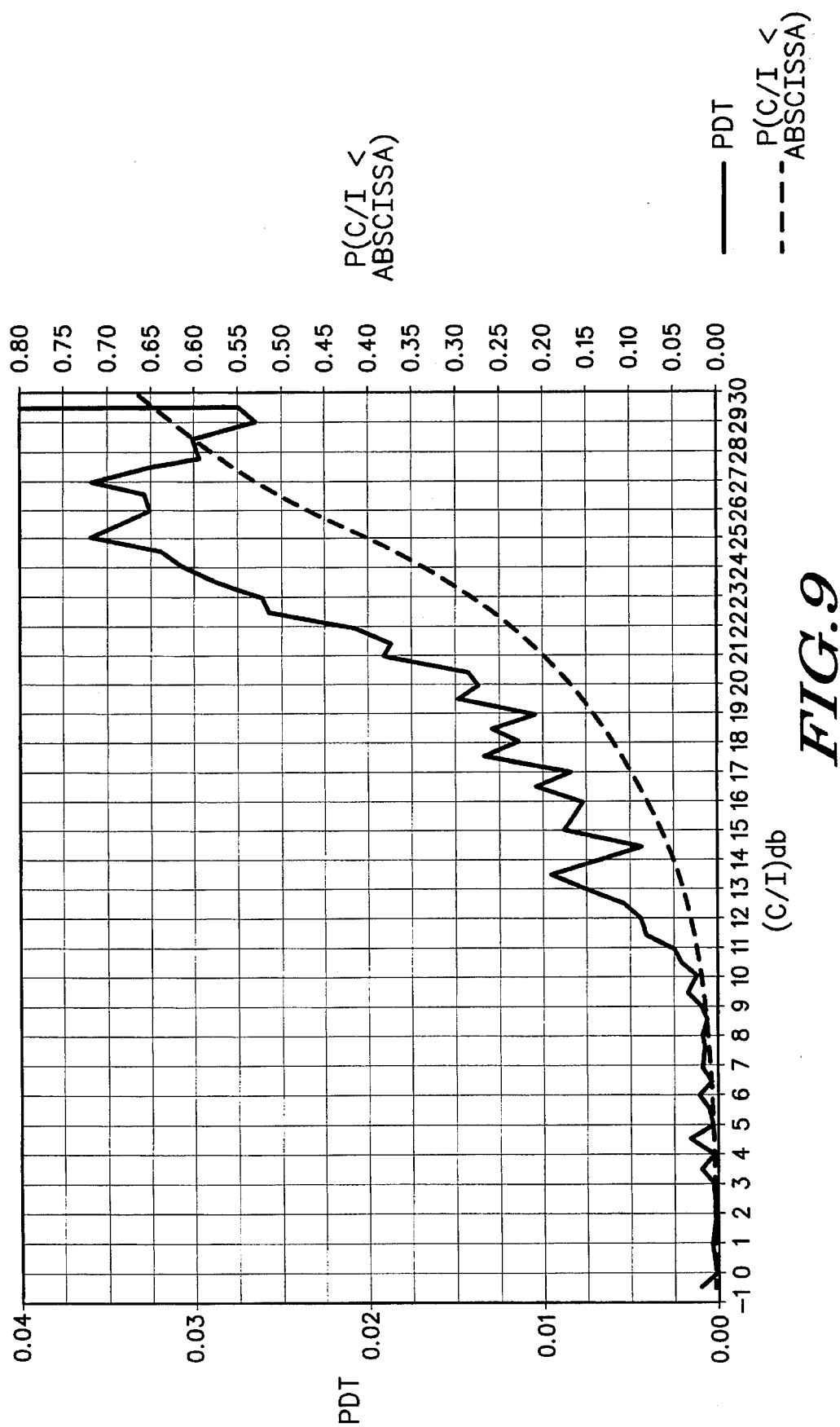
FIG. 9 depicts results of a computer simulation of operation of a communication system under another embodiment of the invention with a 3 cell repeat pattern.

FIG. 9 represents a 3 cell repeat pattern with 6 subsectors per sector. FIG. 11, line 4 indicates a C/I above 14 dB 95% of the time, 17.25 dB 90% of the time, and 26.5 dB 95% of the time.

Figure 10:
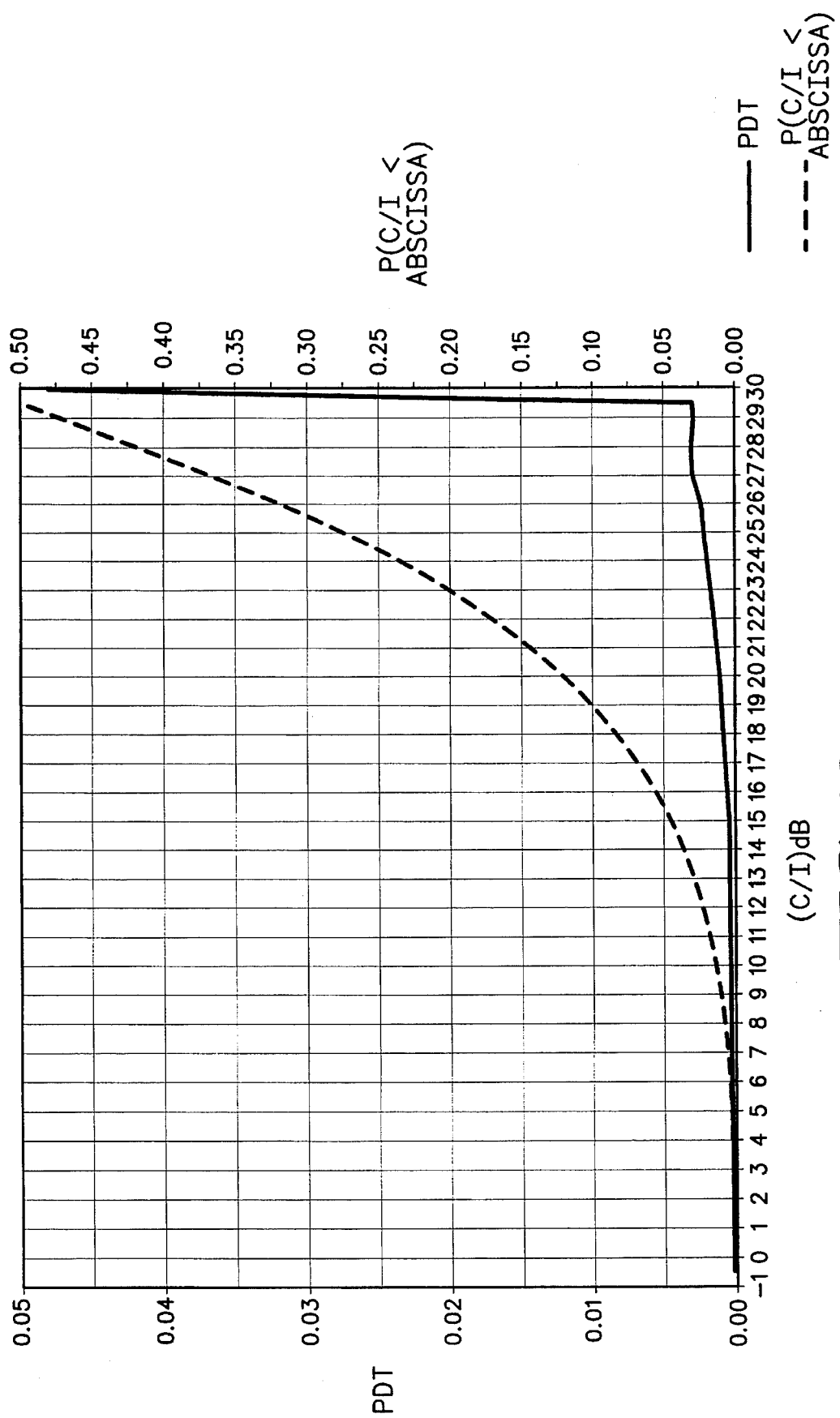
FIG. 10 depicts results of a computer simulation of operation of a communication system under the invention with a 4 cell repeat pattern.

FIG. 10 represents a 4 cell repeat pattern with 4 subsectors per sector. FIG. 11, line 5 indicates a C/I of 15.6 dB 95% of the time, 19 dB 90% of the time, and greater than 30 dB 50% of the time.

In another embodiment of the invention the VNBA may be comprised of a steerable antenna with the steering function and directional signal detection accomplished through phase processing of the received signal. The steerable antenna function may also be obtained through multiple antennas with steerable nulls.

In another embodiment of the invention an identical set of system communication resources are assigned to service coverage areas without restriction as to use within the three sectors. Service requests may be received on any one, of twelve VNBAs covering the service coverage area with such request transferred to the site controller (300) along with the identify of the VNBA receiving the request. A communication resource is identified at random or though a suitable algorithm for allocation to the requesting communication unit. Service is provided to the requesting communication unit through the VNBA serving the area where the communication unit is located.

Shown (FIG. 12) is a block diagram of a matrix switch for providing service to a communication unit in an area served by a VNBA and exclusively through the VNBA. Included within the matrix switch assembly is a number of antennas (1A through NA), a number of linear PAs (1 through N), a number of distribution amplifiers (1 through N), a transmit matrix switch (Tx matrix), a receive matrix switch (Rx matrix), a transmit buffer (600) within memory (300b), and a receive buffer (601) within memory (300b).

As shown (FIG. 12) a service request (400) from a requesting communication unit (200) is received by antenna 1A. The service request (400) is received through distribution amplifier 1, encoded with the identity of the originating VNBA (1A) within the receive matrix switch (Rx matrix), and stored within a buffer (601) within memory (300b) of the site controller (300). The site controller (300) responds with a resource allocation (401) that is stored within a buffer (600) within memory (300b) of the site controller (300). The resource allocation (401) is transferred through the matrix switch (Tx matrix) and transmitted to the requesting communication unit (200) through a linear PA (1) and antenna 1.

Upon allocating a resource to service a communication transaction between the communication unit (200) and a target unit (not shown) the site controller may allocate a transmit buffer location Tx1 (600) and a receive buffer location Rx1 (601) to service the transaction. Allocation of the transmit (Tx1) and receive (Rx1) buffer locations allow communication information to flow through the VNBA (1A) servicing the area in which the requesting communication unit (200) is located. In the above embodiment where a communication resource is allocated to a communication unit (200) through a VNBA (1A) on a random basis throughout the service coverage area the statistical chance of mutual interference from a surrounding service coverage area is very low.

In another embodiment of the invention communication access is available to a communication unit (200) within a service coverage area through one of at least two directional antennas inclusively covering the service coverage area within which the communication unit (200) is located. Resource assignments to the requesting communication unit (200) are on a random basis from a plurality of communication resources available within the system to requesting communication units. Mutual interference is suppressed by the random nature of the resource assignments and by the directional nature of the communicating antenna. Mutual interference may be further suppressed through a suitable encoding technique such as CDMA so as to produce a reuse factor of one among the service coverage areas. Use of the CDMA encoding technique and at least two directional antennas also allows re-use of communication resources is adjacent subsectors as well as adjacent service coverage areas.

What is claimed is:

1. An apparatus for improving signal quality of a signal communicated on a communication resource within a communication system between a communication unit located within a service coverage area of a base site of a plurality of base sites within the communication system and the base site, such apparatus comprising:

A) means for sectorizing each service coverage area of the plurality of service coverage areas into substantially identical, orientation specific patterns of at least three sectors;

B) means for assigning at least some resources of the plurality of resources to each sector of the at least three sectors in a substantially identical, orientation specific pattern among the service coverage areas;

C) means for dividing each sector into at least four partially overlapping subsectors, inclusive of the sector, with each subsector substantially covered by a directional antenna; and D) means for providing communication access on a randomly selected resource of the at least some resources assigned to the sector to an at least one communication unit located within a subsector through the directional antenna, of the at least four directional antennas, covering the subsector in which a signal is received from the at least one communication unit.

2. The apparatus as in claim 1 further including means for communicating a signal under a CDMA format.

* * * * *